(12) United States Patent
Lee et al.

(10) Patent No.: US 11,843,670 B2
(45) Date of Patent: Dec. 12, 2023

(54) PACKET DATA UNIT (PDU) SESSION CONTROL METHOD AND APPARATUS

(71) Applicant: Samsung Electronics Co., Ltd., Gyeonggi-do (KR)

(72) Inventors: Soomin Lee, Gyeonggi-do (KR); Jangbok Lee, Gyeonggi-do (KR); Hansung Leem, Gyeonggi-do (KR); Hyejeong Kim, Gyeonggi-do (KR); Sangho Lee, Gyeonggi-do (KR); Mooyoung Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 181 days.

(21) Appl. No.: 16/534,619

(22) Filed: Aug. 7, 2019

(65) Prior Publication Data
US 2020/0092380 A1 Mar. 19, 2020

(30) Foreign Application Priority Data

Sep. 17, 2018 (KR) .................. 10-2018-0110955

(51) Int. Cl.
*H04L 67/141* (2022.01)
*H04L 67/143* (2022.01)
*H04L 43/08* (2022.01)

(52) U.S. Cl.
CPC ............ *H04L 67/141* (2013.01); *H04L 43/08* (2013.01); *H04L 67/143* (2013.01)

(58) Field of Classification Search
CPC ..... H04L 43/08; H04L 67/143; H04L 67/141; H04L 76/10; H04W 88/02

(Continued)

(56) References Cited

U.S. PATENT DOCUMENTS 8,612,576 B1 * 12/2013 Brandwine ............. H04L 45/42
709/224
2006/0277023 A1 * 12/2006 Maiti ...................... G06F 9/451
703/22

(Continued)

FOREIGN PATENT DOCUMENTS

CN 107113294 8/2017
CN 109922472 A * 6/2019 ......... H04L 41/0893

(Continued)

OTHER PUBLICATIONS

Huawei et al., "Update and Clarification of AF Influence on Traffic Routing", S2-178841, 3GPP TSG SA WG2 Meeting #124, Nov. 27-Dec. 1, 2017, 9 pages.

(Continued)

*Primary Examiner* — David R Lazaro
*Assistant Examiner* — Mariegeorges A Henry
(74) *Attorney, Agent, or Firm* — The Farrell Law Firm, P.C.

(57) ABSTRACT

An electronic device and a method of an electronic device are provided. The electronic device includes a memory, a communication module, and a processor configured to identify application information stored in the memory, monitor network status using the communication module, and control a packet data unit (PDU) session based on the application information or the network status. The method includes identifying application information stored in a memory of the electronic device; monitoring network status using a communication module of the electronic device; and controlling a PDU session based on the application information or the network status.

17 Claims, 9 Drawing Sheets

(58) Field of Classification Search
USPC .................................. 709/217, 223, 224, 227
See application file for complete search history.

(56) References Cited

U.S. PATENT DOCUMENTS

| | | | |
|---|---|---|---|
| 2008/0244057 A1* | 10/2008 | Kojima | H04L 67/34 709/223 |
| 2009/0135731 A1* | 5/2009 | Secades | H04W 68/12 370/252 |
| 2013/0107727 A1* | 5/2013 | Lunden | H04W 52/0216 370/252 |
| 2013/0114482 A1 | 5/2013 | Oh et al. | |
| 2014/0366041 A1 | 12/2014 | Stanley-Marbell et al. | |
| 2015/0016299 A1 | 1/2015 | Zhang et al. | |
| 2016/0142447 A1 | 5/2016 | Mufti et al. | |
| 2016/0234116 A1 | 8/2016 | Lee et al. | |
| 2017/0006065 A1* | 1/2017 | Kamble | H04L 63/1441 |
| 2017/0317894 A1* | 11/2017 | Dao | H04L 41/5009 |
| 2018/0115891 A1 | 4/2018 | Kim et al. | |
| 2018/0192390 A1* | 7/2018 | Li | H04W 4/50 |
| 2018/0199240 A1* | 7/2018 | Dao | H04L 41/0894 |
| 2019/0174387 A1* | 6/2019 | Kawasaki | H04W 36/08 |
| 2020/0037148 A1* | 1/2020 | Wang | H04W 76/25 |
| 2020/0037345 A1* | 1/2020 | Ryoo | H04W 72/1284 |
| 2020/0128507 A1* | 4/2020 | Ryu | H04W 60/04 |
| 2020/0351716 A1* | 11/2020 | Zu | H04W 28/08 |

FOREIGN PATENT DOCUMENTS

| | | |
|---|---|---|
| KR | 1020090035361 | 4/2009 |
| KR | 1020180078338 | 7/2018 |
| WO | WO 2012/015234 | 2/2012 |
| WO | WO 2018/128126 | 7/2018 |

OTHER PUBLICATIONS

Huawei et al., "TS 23.501: AF Influenced PDU Session Establishment and DN Authentication/Authorization via NEF", S2-177983, 3GPP TSG SA WG2 Meeting#123, Oct. 23-27, 2017, 6pgs.
LG Electronics, "Support of Service Continuity using Tunnelling between UP Functions", S2-164429, SA WG2 Meeting #116bis, Aug. 29-Sep. 2, 2016, 7 pages.
European Search Report dated Jan. 24, 2020 issued in counterpart application No. 19192911.6-1231, 8 pages.
3GPP, 3rd Generation Partnership Project; Technical Specification Group Core Network and Terminals; 5G System; Session Management Services.
Stage 3 (Release 15), 3GPP TS 29.502 V15.0.0, Jun. 15, 2018, 116 pages.
International Search Report dated Oct. 24, 2019 issued in counterpart application No. PCT/KR2019/008997, 8 pages.
3GPP, 3rd Generation Partnership Project; Technical Specification Group Core Network and Terminals; Non-Access-Stratum (NAS) Protocol for.
5G System (5GS); Stage 3 (Release 15), 3GPP TS 24.501 V0.2.2, Dec. 2017, 178 pages.
European Search Report dated Jun. 17, 2022 issued in counterpart application No. 22150242.0-1215, 11 pages.
3GPP TS 24.526 1.2.0, 3GPP, 3rd Generation Partnership Project; Technical Specification Group Core Network and Terminals; UE Equipment (UE) Policies.
For 5G System (5GS); Stage 3 (Release 15), Aug. 2018, 37 pages.
Korean Office Action dated Nov. 8, 2022 issued in counterpart application No. 10-2018-0110955, 10 pages.
Chinese Office Action dated Sep. 9, 2023 issued in counterpart application No. 201980060245.4, 16 pages.
Korean Office Action dated May 18, 2023 issued in counterpart application No. 10-2018-0110955, 10 pages.

* cited by examiner

PACKET DATA UNIT (PDU) SESSION CONTROL METHOD AND APPARATUS

CROSS-REFERENCE TO RELATED APPLICATION(S)

This application is based on and claims priority under 35 U.S.C. § 119 to Korean Patent Application No. 10-2018-0110955, filed on Sep. 17, 2018, in the Korean Intellectual Property Office, the disclosure of which is incorporated by reference herein in its entirety.

BACKGROUND

1. Field

The present disclosure relates generally to a packet data unit (PDU) session control method and apparatus.

2. Description of the Related Art

Mobile communication systems that developed at the outset to provide subscribers with voice services on the move have expanded their service area to now include data services as well as voice services. In addition, the explosive growth of mobile data traffic in recent years has led to a resource shortage, which is spurring migration to the long term evolution-advanced (LTE-A) communication standard system (or 4th generation (4G) communication system) to meet the needs of users for high speed data services.

Even after the commercialization of the 4G system, there is a worldwide effort to develop a 5th generation (5G) or pre-5G communication system operating in an ultrahigh frequency band (e.g., 60 GHz) to achieve a higher data transmission speed and higher data rate. The 5G communication system is likely to be designed to have a scalable system structure and functionality that is capable of supporting in one system various services having different requirements. This may allow 5G networks to provide the services having different requirements simultaneously in order for various kinds of electronic devices and applications to operate efficiently.

In the 4G communication system, an electronic device may establish a packet data network (PDN) session with a network for use of a data service. Data services provided by the 4G communication system may include a multimedia messaging service (MMS), a direct Internet access service, and an internet protocol multimedia subsystem (IMS) service. One of the conventional methods for an electronic device to release a data service in progress is to release (or disable) an application-wide network or an electronic device-wide network. In the legacy system where there were few access point names (APNs) necessary for an electronic device and where even data services available for use were limited in number, there was no need to control a PDN session for use of a data service. Accordingly, PDN session-related APNs and PDN session connections were almost all controlled by a network operator.

In addition, the 5G communication system is designed in consideration of the diversification of data services and electronic devices. However, an electronic device can neither support all of various data services and applications nor control PDU sessions with newly-added parameters. For example, unless a user manually operates an electronic device to establish a PDU session, the electronic device cannot autonomously control a PDU session establishment to a new APN or a data network name (DNN). The electronic device establishes a PDU session with a preconfigured APN or DNN value during its bootup and releases the PDU session depending on the network situation rather that its own situation.

SUMMARY

According to an aspect of the present disclosure, an application information-based or network status-based autonomous PDU session control method and apparatus of an electronic device are provided.

In accordance with an aspect of the present disclosure, an electronic device is provided. The electronic device includes a memory, a communication module, and a processor configured to identify application information stored in the memory, monitor network status using the communication module, and control a PDU session based on the application information or the network status.

In accordance with another aspect of the present disclosure, a method of an electronic device is provided. The method includes identifying application information stored in a memory of the electronic device, monitoring network status using a communication module of the electronic device, and controlling a PDU session based on the application information or the network status.

According to various embodiments, the electronic device may autonomously control the PDU session per application based on the application information or the network status.

According to various embodiments, it may be possible to control a PDU session without any intervention from a user by establishing the PDU session selectively based on application information necessary for PDU session establishment.

According to various embodiments, it may be possible to efficiently use system resources of an electronic device by establishing or releasing a PDU session based on a current network status.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION

Figure 1:
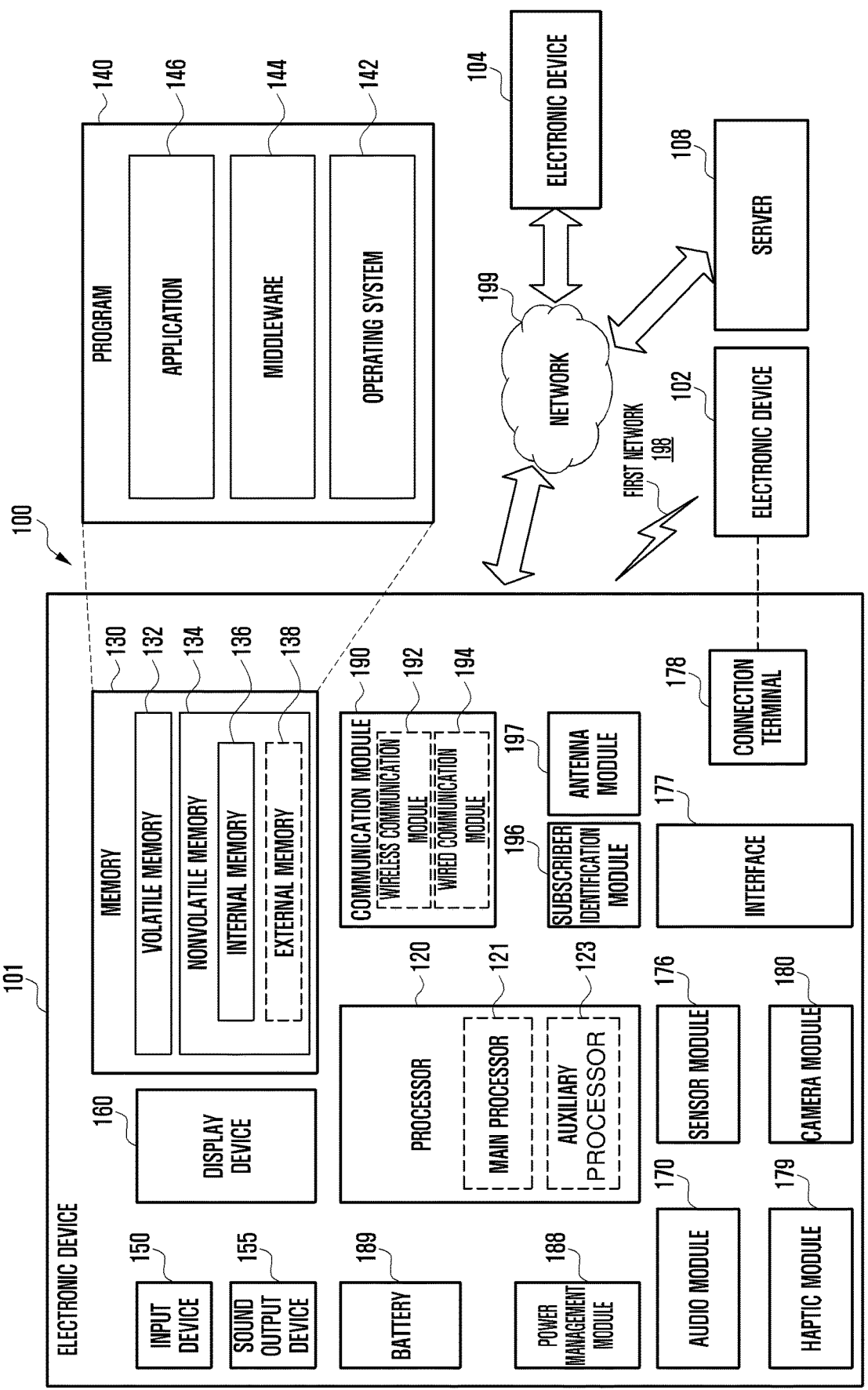
FIG. 1 is a block diagram of an electronic device in a network environment according to an embodiment.

An electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the present disclosure, the electronic devices are not intended to be limited to those described above.

It should be appreciated that various embodiments of the present disclosure and the terms used therein are not intended to limit the technological features set forth herein to particular embodiments but are intended to include various changes, equivalents, or replacements for a corresponding embodiment. With regard to the description of the accompanying drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "$1^{st}$," "2nd," "first," and "second" may be used to simply distinguish a corresponding component from another component, but does not limit the components in another aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wiredly), wirelessly, or via a third element.

As used herein, the term "module" may include a unit implemented in hardware, software, or firmware, and may be used interchangeably with other terms, for example, "logic," "logic block," "part," and "circuitry". A module may be a single integral component, or a minimum unit or part thereof, adapted to perform one or more functions. For example, according to an embodiment, a module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute the at least one of the one or more instructions, with or without using one or more other components under the control of the processor. This allows the machine to be operated to perform at least one function according to the at least one instruction invoked. The one or more instructions may include code generated by a complier or code executable by an interpreter. The machine-readable storage medium may be provided in the form of a non-transitory storage medium. Wherein, the term "non-transitory" simply indicates that the storage medium is a tangible device, but does not include a signal (e.g., an electromagnetic wave), where this term does not differentiate between where data is semi-permanently stored in the storage medium and where the data is temporarily stored in the storage medium.

A method according to various embodiments of the present disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

FIG. 1 is a block diagram of an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 may include a processor 120, memory 130, an input device 150, a sound output device 155, a display device 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. At least one (e.g., the display device 160 or the camera module 180) of the components may be omitted from the electronic device 101, or one or more other components may be added to the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware component or a software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing a record, and the receiver may be used for an incoming calls. The receiver may be implemented as separate from, or as part of, the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). The connection terminal 178 may include, for example, an HDMI connector; a USB connector, an SD card connector, or an audio connector (e.g., a headphone connector), The haptic module 179 may convert an electrical signal into a mechanical stimulus (e.g., a vibration or a movement) or an electrical stimulus which may be recognized by a user via the user's tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the electronic device 102, the electronic device 104, or the server 108 and performing communication via the established communication channel. The communication module 190 may include one or more communication processors that are operable independently from the processor 120 (e.g., an AP) and supports a direct (e.g., wired) communication or a wireless communication. The communication module 190 may include a wireless communication module 192 (e.g., a cellular communication module, a short-range wireless communication module, a global navigation satellite system (GNSS) communication module), or a wired communication module 194 (e.g., a local area network (LAN) communication module or a power line communication (PLC) module). A corresponding one of these communication modules may communicate with an external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single integrated circuit or chip), or may be implemented as multi components (e.g., multi chips) separate from each other. The wireless communication module 192 may identify and authenticate the electronic device 101 in a communication network, such as the first network 198 or the second network 199, using subscriber information (e.g., an international mobile subscriber identity (IMSI)) stored in the SIM 196.

The antenna module 197 may transmit or receive a signal or power to or from the outside (e.g., an external electronic device) of the electronic device 101. The antenna module 197 may include one or more antennas, and, therefrom, at least one antenna appropriate for a communication scheme used in the communication network, such as the first network 198 or the second network 199, may be selected, for example, by the communication module 190 or the wireless communication module 192. The signal or the power may then be transmitted or received between the communication module 190 and an external electronic device via the selected at least one antenna.

At least some of the above-described components may be coupled mutually and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the electronic device 102, the electronic device 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function, or an additional service related to the request, and transfer an outcome of performing the at least part of the function or the service requested, an additional function, or an additional service related to the request to the electronic device 101. The electronic device 101 may provide the outcome, with or without further processing of the outcome, as at least part of a reply to the request. To that end, a cloud computing, distributed computing, or client-server computing technology may be used, for example.

Figure 2:
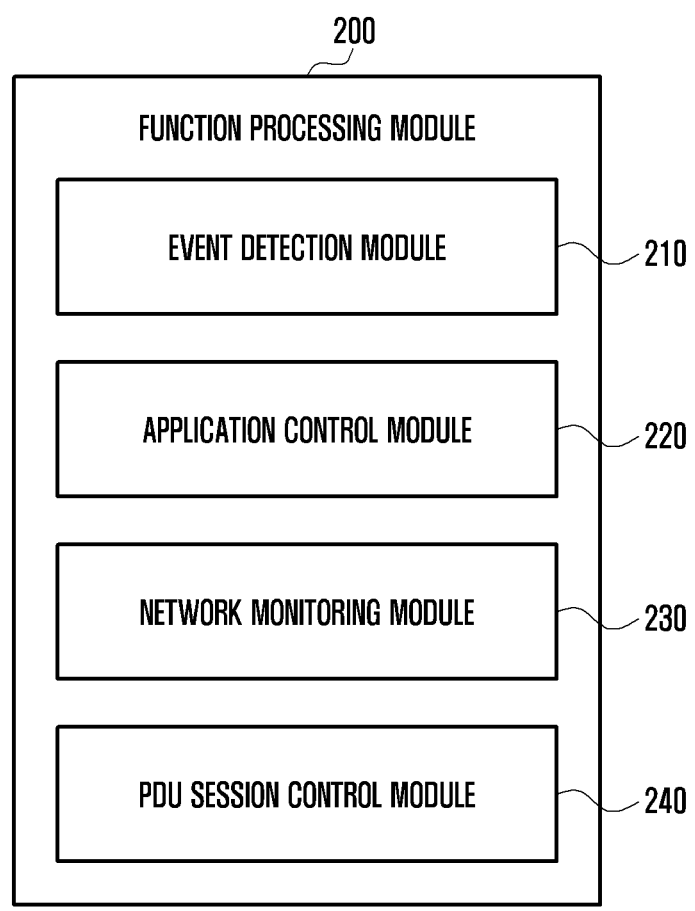
FIG. 2 is a block diagram of a function processing module of an electronic device according to an embodiment.

FIG. 2 is a block diagram of a function processing module of an electronic device according to an embodiment.

Referring to FIG. 2, the function processing module 200 may be, in the form of a hardware module, included in a processor (e.g., processor 120 in FIG. 1) including a processing circuitry or implemented as a software module executable by the processor 120. The function processing module 200 may include an event detection module 210, an application control module 220, a network monitoring module 230, and a PDU session control module 240.

The event detection module 210 may detect a PDN session-related event. Examples of PDN session-related events may include establishment of a PDU session for a data service and signaling for triggering reestablishment. PDU sessions may differ between applications in the 5G communication system. The event detection module 210 may detect a PDU session-related event for controlling the PDU session as necessary.

The event detection module 210 may detect an event based on at least one of a user input, application information, network status, or electronic device (e.g., electronic device 101 in FIG. 1) configuration information.

The user input may be an input for installing or executing an application requiring establishment of a PDU session. If a user input requesting for installing or executing an application requiring PDU session establishment is detected, the event detection module may generate a PDU session-related event. The PDU session-related event may be an event for establishing a PDU session necessary for execution of the application that is requested by the user. If a user input for executing an application requiring PDU session establishment is received through an input device (e.g., input device 150 in FIG. 1), the event detection module 210 may generate a PDU session-related event.

The application information may include at least one of an application identifier, an application type, or an application file. The application identifier may be uniquely assigned for identifying the application. The application identifier may be assigned by a developer of the application or, if the application is published in an application store, by the store provider. The application type may include an indicator related to execution of the application. For example, a game application may be executed in response to a user request while a messenger application may be running in the background. The application type may be determined by the application execution condition. For example, the messenger application may be automatically executed (without intervention of the user) upon installation. The application file may be data necessary for the application to be installed or executed in the electronic device. The application information may be stored in the memory (e.g., memory 130 in FIG. 1) of the electronic device. If a request for execution of an application requiring PDU session establishment is received from the application control module 220, the event detection module 210 may generate a PDU session-related event.

The network status may include whether the current network status allows PDU session establishment. The network status may vary according to the location of the electronic device. The network information may include at least one of information indicating whether allowed network slice selection assistance information (NSSAI) is changed, information indicating whether local area data network (LADN) is supported, information indicating whether multi-access edge computing (MEC) is supported, and/or information indicating whether user equipment (UE) route selection policy (URSP) is changed. The NSSAI may include multiple parameters necessary for selecting a network slice instance belonging to a radio access network (RAN) and a core network (CN). The NSSAI may be used for selecting a common control network function (CCNF) and a network slice instance along with the functions (e.g., capability) and subscription information (e.g., subscription data) of the electronic device 101.

The electronic device 101 may acquire the allowed NSSAI for a public land mobile network (PLMN) from an access and mobility management function (AMF). The electronic device 101 may use a single-NSSAI (S-NSSAI) included in the allowed NSSAI corresponding to the network slice for a procedure of selecting a network in the PLMN. The allowed network slice may determine an available PDU. Whether an LADN is available may be determined according to the location of the electronic device 101 and determine whether to establish or release a PDU session. A PDU session may be established or released according to a URSP update.

The event detection module 210 may receive information on the network status from the network monitoring module 230 and issues, if it is determined that the network status allows PDU session establishment, a PDU session-related event. In this case, the PDU session-related event for establishing a PDU session is exemplified under the assumption that the current network status allows PDU session establishment, and a PDU session-related event may be an event for releasing an ongoing PDU session in a case where the current network status does not allow the ongoing PDU session. The event detection module 210 may determine whether there is an application capable of establishing a PDU session based on the application information and/or the network status. For example, if there is an application capable of establishing a PDU session, the event detection module 210 may generate a PDU session-related event.

The configuration information of the electronic device 101 may include a value configured to the electronic device 101 in association with the network. For example, the configuration information may include an APN, a DNN, network slicing, information indicating whether an LADN service is supported, information indicating whether MEC is in use, and a URSP.

The APN may be information on a target (e.g., a mobile communication operator) that allows the electronic device 101 to connect to a network for data communication. For example, a service provider for providing the electronic device 101 with a network service and Internet access may be configured to the electronic device 101 in an initial communication service configuration procedure. Similar to the APN, the DNN may be information on the target for proving a data network identified specifically in the 5G communication system. Network slicing may be a technique for providing network resources and network functions with an independent slice in a service-specific manner. A network slice may be a network that is logically combining an access network and a core network. The electronic device 101 may connect to one or more network slice instances via a 5G access network (5G-AN).

The LADN may be a data network connectable only when the electronic device is located in a certain area. The electronic device 101 may connect to a local data network within an LADN in the 5G communication system. For example, the local data network may apply at least one of an enterprise network (e.g., an intranet) or a stadium, a special event, a concert or an Internet of things (IoT) service. MEC may be a technique for processing data by locating a server close to the user (e.g., the electronic device 101) interested in use of the communication service (e.g., locating the server at a base station). By applying MEC, it may be possible to shorten data transmission time and provide a customized service. The URSP is a policy for selecting a route; if the policy is changed, a connection should be established according to the changed policy or the connection fails.

The event detection module 210 may determine where there is an application requiring a PDU session connection based on the application information, the network status, and/or the configuration information. For example, if there is an application configured to autonomously establish a PDU session when the current network status allows PDU session establishment among the installed applications, the event detection module 210 may generate a PDU session-related event. The event detection module 210 may send the PDU session-related event to the PDU session control module 240.

The event detection module 210 may detect a PDU session-related event based on a use history of an application. For example, the event detection module 210 may detect an event for releasing a PDU session for an application that is seldom in use according to a determination made based on the application-specific use histories collected during a predetermined time period (e.g., one day, one week, one month, and one power cycle).

The application control module 220 may be a module for controlling installment and execution of applications. The application control module 220 may install or execute an application requiring a data communication in response to a user request. If an application requiring PDU session establishment is installed, the application control module 220 may store application information on the installed application in the memory 130. If the installed application is a type of application that is executed or always running in the background, the application control module 220 may execute the application and notify the event detection module 210 of the execution.

The application control module 220 may install or execute an application requiring PDU session establishment based on the application information and/or network status. For example, the application control module 220 may receive information on the network status from the network monitoring module 230. Because the network information may be changed according to the location of the electronic device 101, if there is an application installable based on the network status information received from the network monitoring module, the application control module 220 may display an application list containing at least one installable application to the user. The application control module 220 may install the installable application according to the settings of the electronic device 101 or in response to a user input. The application control module 220 may also autonomously execute the installed application based on the settings of the electronic device 101 or in response to a user input.

If the network status is changed as the electronic device 101 moves such that an application requiring PDU session establishing becomes executable among the installed applications, the application control module 220 may display an application list containing at least one executable application to the user. The application control module 220 may also autonomously establish a PDU session to a DNN for the executable application based on the settings of the electronic device 101 or in response to a user input and execute the application. The application may also be automatically executed based on the location information without intervention of the application control module 220. The application may also be automatically installed or executed based on the application information stored in the memory 130. The application information may be stored in the application itself. The application may directly identify the location information to retrieve the application information stored in the application itself. The application may be automatically executed based on the location information. The application may also be executed based on the location information received by the communication module 190 of the electronic device 101.

The application control module 220 may control applications based on time information or location information. For example, if the electronic device 101 is located at a certain place (e.g., a home and an office), the application control module 220 may autonomously execute a certain application at the certain location. The application control module 220 may also autonomously execute or terminate a certain application at a certain time. For example, the application control module 220 may be configured to execute a certain application (e.g., a game application) at 7:00 AM. The application control module 220 may be configured to terminate the certain application at 12:00 PM (e.g., noon).

The application control module 220 may be configured to terminate executions of all running applications with the exception of always-on applications if the electronic device 101 is located at home (e.g., a geographical location) at 1:00 AM. The application control module 220 may also be configured to terminate executions of all running applications if the electronic device 101 is located at home (e.g., a geographical location) at 1:00 AM. The application control module 220 may also be configured to execute a predetermined application (e.g., a business-related application) if the electronic device is located at the office at 10:00 AM.

The application control module 220 may install or execute an application requiring a PDU session establishment based on at least one of application information, network status, and/or settings of the electronic device 101. For example, if there is an application that becomes installable as the network status changes, the application control module 220 may autonomously install the application according to the settings of the electronic device 101. If there is an application that becomes installable as the network status changes, the application module 220 may autonomously execute the application according to the settings of the electronic device 101.

The application control module 220 may establish a PDU session for an application configured to operate in a power-saving mode obviating a necessity of real-time synchronization, upon execution of the application.

The network monitoring module 230 may monitor the network status. The network monitoring module 230 may determine the network status based on the location information of the electronic device 101, which is transmitted by the communication module 190 of the electronic device 101. The network monitoring module 230 may also send the information on the network status to the communication module 190 of the electronic device 101. The network monitoring module 230 may acquire the network information, which may change as the electronic device 101 moves, and determine whether the network status is changed based on the network information.

For example, the network information may include at last one of information indicating whether allowed NSSAI is changed, information indicating whether an LADN is supported, information indicating whether MEC is supported, or information indicating whether a URSP is changed. For example, if the network status is changed, an application that could not be previously installed or executed may currently become installable or executable. The network monitoring module 230 may evaluate the suitability of a policy value in the URSP based on whether the URSP value itself has been changed and the current network status. Even though the application can be installed and executed regardless of the network status information, a quality of service (QoS) is not guaranteed. If a change is detected in the network information acquired in real time, the network monitoring module 230 may send the network information or information on the network status to the event detection module 210.

The PDU session control module 240 may be a module for controlling a PDU session. Controlling a PDU session may include at least one of establishing a PDU session, releasing (e.g., disabling) the established PDU session, releasing the established PDU session and reestablishing the PDU session, and modifying the PDU session. If a PDU session-related event occurs, the PDU session control module 240 may control the PDU session. For example, if there is an application requiring PDU session establishment, the PDU session control module 240 may establish a PDU session with a DNN for the corresponding application. For example, if it becomes possible to establish a new PDU session as the electronic device 101 moves, the PDU session control module 240 may establish a new PDU session or reestablish a released old PDU session without any intervention of the user. If the application is terminated, the PDU session control module 240 may release the established PDU session.

The PDU session control module 240 may control a PDU session based on time information or location information. For example, if the electronic device 101 is located at a predetermined location (e.g., a home and an office) at a predetermined time, the PDU session control module 240 may control the PDU session. For example, the PDU session control module 240 may be configured to release PDU sessions corresponding to the currently running applications with the exception of always-on applications if the electronic device 101 is located at home (e.g., a geographical location) at 1:00 AM. The PDU session control module 240 may also be configured to release PDU sessions corresponding to the currently running applications with the exception of always-on applications if the electronic device 101 is located at the office at 10:00 AM. The PDU session control module 240 may also be configured to release a PDU session corresponding to a predetermined application if the electronic device 101 is located at the office at 10:00 AM. The PDU session control module 240 may be configured to establish a PDU session for an application in a predetermined situation (e.g., an ultra-reliable low latency communication (URLLC) application is executed).

The PDU session control module 240 may release a previously established PDU session based on the network status or a use history of the application. For example, the PDU session control module 240 may release a PDU session for an application that is seldom in use. For example, the PDU session control module 240 may be configured to establish a PDU session for a game application at 7:00 AM based on the use history of the application (e.g., a game application) in which the application has been frequently used by a user and is not an always-on application (e.g., always running in the background) and the user has not checked data during a period between 12:00 PM and 7:00 AM. The PDU session control module 240 may also be configured to establish a PDU session at 7:00 AM based on the use history if a wakeup alarm is set to 7:00 AM in the electronic device 101.

The PDU session control module 240 may control a PDU session based on system resources of the electronic device 101, network status, and/or application use history. The electronic device 101 may be designed to manage constrained system resources (e.g., a process, memory, and power) efficiently in hardware or software. For example, the PDU session control module 240 may release a PDU session established for an application not in frequent use (e.g., an application with no use history during a predetermined time period) if the electronic device 101 is running short of system resources. For example, the PDU session control module 240 may modify the PDU session for an application that always stays running in the background based on the network status to maintain the ongoing service corresponding to the application. The PDU session modification may include a handover from the established PDU session to another PDU session.

According to various embodiments, the electronic device (e.g., electronic device 101 in FIG. 1) may include a memory (e.g., memory 130 in FIG. 1), a communication module (e.g., communication module 190 in FIG. 1), and a processor (e.g., processor 120 in FIG. 1) that is configured to identify application information stored in the memory, monitor for network status by means of the communication module, and control a PDU session based on the application information or the network status.

The processor may be configured to establish the PDU session based on the application information and the network status and execute the application corresponding to the established PDU session.

The processor may be configured to establish a PDU session per application.

The processor may be configured to install an application in response to a user request, determine whether a PDU session is able to be established for the installed application, and establish the PDU session corresponding to the installed application based on the PDU session being able to be established.

The processor may be configured to control the PDU session according to the network status based on the PDU session being unable to be established for the installed application.

The processor may be configured to in response to a request for terminating execution of an application for which the PDU session was established, release the PDU session corresponding to the application and terminate the execution of the application.

The processor may be configured to release the PDU session corresponding to an executing application based on the network status and terminate the execution of the application.

The processor may be configured to modify a PDU session established for a running application based on the network status.

The processor may be configured to generate an application list based on the network status and notify a user of a presence of an installable application based on the application list including the installable application.

The processor may be configured to install the installable application based on settings of the electronic device or a user input.

The processor may be configured to generate an application list based on the network status and notify a user of a presence of an executable application based on the application list including the executable application.

The processor may be configured to execute the executable application based on settings of the electronic device or a user input.

The processor may be configured to collect use history of an application and release the PDU session corresponding to an executing application based on the use history.

The processor may be configured to configure a priority based on the use history and release the PDU session corresponding to a running application based on the network status and the priority.

The processor may be configured to change an application execution condition based on the use history and establish a PDU session corresponding to the application based on the changed application execution condition.

Figure 3:
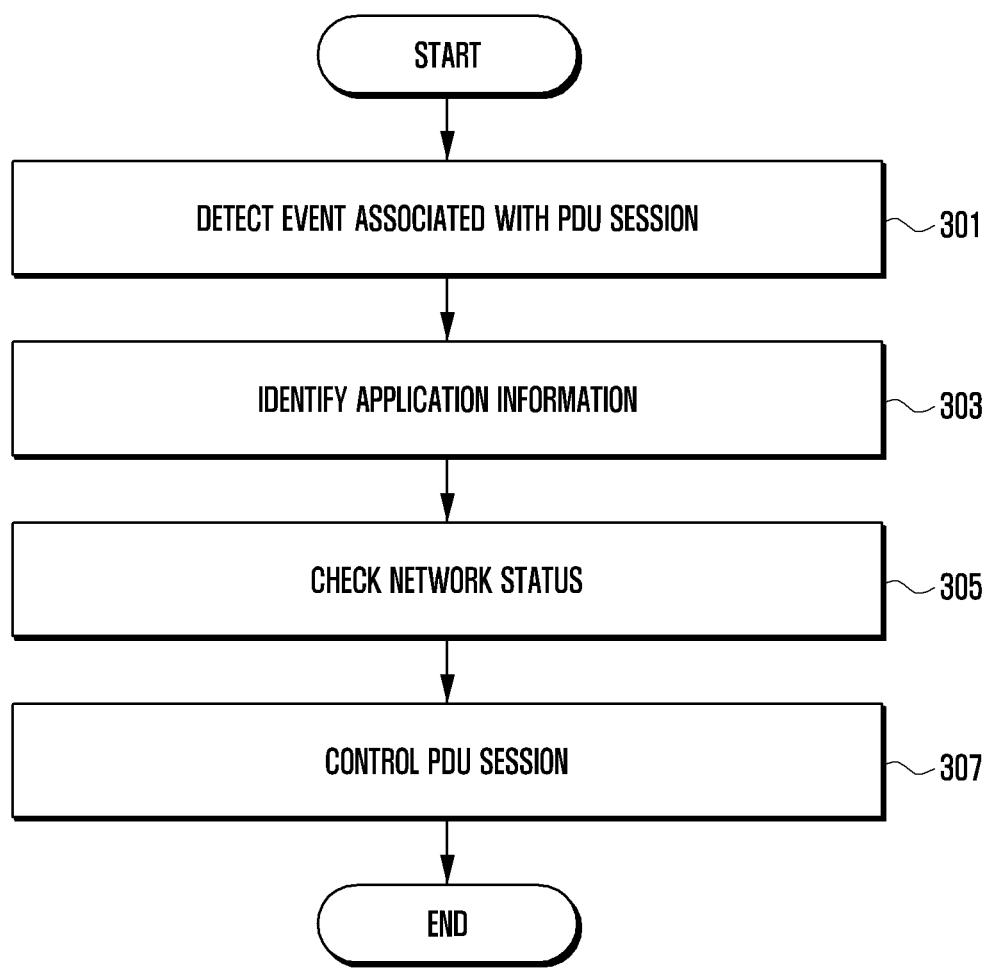
FIG. 3 is a flowchart of a method of an electronic device according to an embodiment.

FIG. 3 is a flowchart of a method of an electronic device according to an embodiment.

Referring to FIG. 3, a processor (e.g., processor 120 in FIG. 1) of the electronic device (e.g., electronic device 101 in FIG. 1) may detect a PDU session-related event at step 301. For example, the processor 120 or the event detection module 210 in FIG. 2 may determine whether there is a user request for executing an application requiring PDU session establishment. For example, although it may be possible for a newly executed application to share a PDU session that has already been established or is in the middle of being established, PDU sessions may differ between applications in the 5G communication system that supports various types of data services and applications. The processor 120 may determine whether an execution condition of an application requiring a PDU session is satisfied based on the configuration information of the electronic device. The configuration information may include at least one of an APN, a DNN, network slicing, information indicating whether an LADN service is supported, information indicating whether MEC is in use, and information indicating whether a URSP is satisfied.

The processor 120 or the application control module 220 in FIG. 2 may identify the application information at step 303. The application information may include at least one of an application identifier, an application type, or an application file. The processor 120 may acquire the application information and store the acquired application in the memory 130 while installing the application. The processor 120 may update the application information periodically or selectively. The update of the application information may change the application type such that the corresponding application is automatically executed. For example, if the application type is changed from an application being executed in response to a user request to an always-on application, the processor 120 may execute the corresponding application to run always. In addition, if the application type is changed from an always-on application to an application being executed in response to a user request, the processor 120 may execute the corresponding application only when a user request is input. The processor 120 may collect per-application use histories. The processor 120 may collect the per-application use histories during a predetermined time period (e.g., one day, one week, one month, and one power cycle) and store the per-application user histories in the memory 130.

At step 305, the processor 120 (e.g., the network monitoring module 230) may check the network status. The network status may vary as the electronic device 101 moves. The processor 120 may acquire the network information in real time and determine whether the network status is changed based on the acquired network information. The network information may include at least one of information indicating whether allowed NSSAI is changed, information indicating whether an LADN is supported, information indicating whether MEC is supported, or information indicating whether a URSP is changed. The processor 120 may determine the network status based on the location information of the electronic device 101 that is received from the communication module 190 of the electronic device 101. The processor 120 may also receive the information on the network status from the communication module 190.

Steps 301, 303, and 305 may be performed simultaneously or step 301 may be performed after steps 303 and 305 are performed in order. Steps 301, 303, and 305 should be performed before step 307 but are not limited to the disclosed order.

At step 307, the processor 120 or the PDU session control module 240 may control a PDU session based on the application information and the network status. If there is a request for executing an application requiring PDU session establishment, the processor 120 may establish a PDU session for the application requested for execution. For example, the processor 120 may establish a PDU session for executing the application requiring PDU session establishment. If an application requiring PDU session establishment is installed based on the application type (e.g., a background running application and an always-on application), the processor 120 may establish a PDU session corresponding to the installed application. If the electronic 101 is configured to execute an application without any intervention of the user when the network status is changed, the processor 120 may establish a PDU session corresponding to the application to be executed according to the changed network status. If an application wakes up from a power-saving mode, the processor 120 may establish a PDU session for the corresponding application. If a service requiring a prompt connection establishment such as a URLLC service is triggered, the processor 120 may establish a PDU session for the corresponding application.

The processor may establish a PDU session based on at least one of the application information, the network status, and/or the configuration information. If it becomes possible to establish a PDU session for an application according to a change of the network status as the electronic device 101 moves, the processor 120 may establish a PDU session. The processor 120 may control a PDU session based on at least one of the application information, the settings of the electronic device 101, the network status, and/or the application use history. For example, if it becomes difficult to maintain an established PDU session as the electronic device 101 moves, the processor 120 may release the PDU session or change the PDU session for another PDU session.

Figure 4:
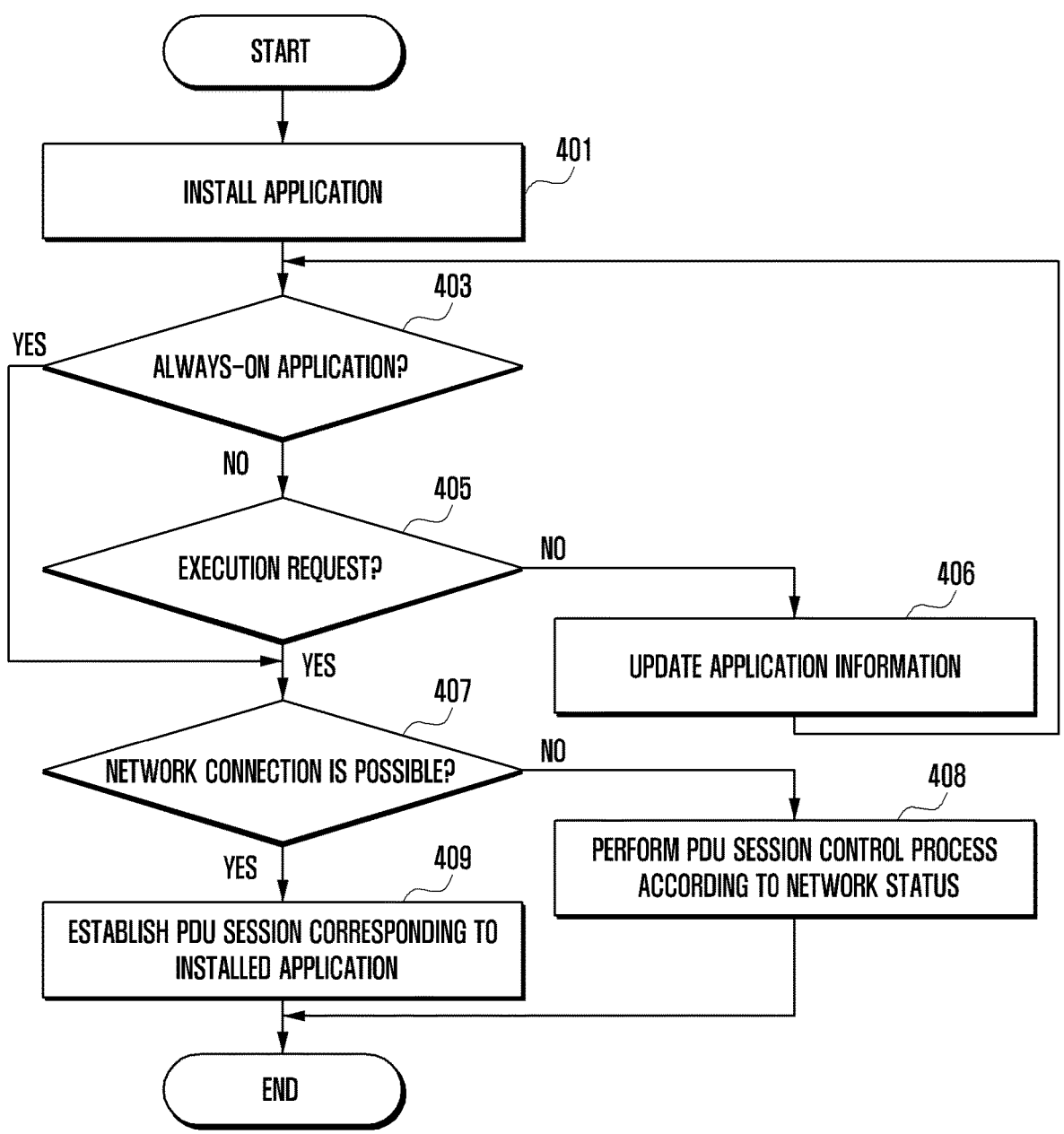
FIG. 4 is a flowchart of an application information-based PDU session establishment method of an electronic device according to an embodiment.

FIG. 4 is a flowchart of an application information-based PDU session establishment method of an electronic device according to an embodiment.

Referring to FIG. 4, a processor (e.g., processor 120 in FIG. 1) of the electronic device (e.g., electronic device 101 in FIG. 1) may install an application at step 401. The processor 120 or the application control module 220 in FIG. 2 may install the application in response to a user request. The processor 120 may install the application that can be installed according to the settings of the electronic device 101.

At step 403, the processor 120 or the application control module 220 may determine whether the installed application is an always-on application. For example, if the type of the installed application is an application running in the background or an application running always, the processor 120 may determine that the installed application is an always-on application. The procedure goes to step 407 for the case where the installed application is an always-on application and to step 405 for the case where the installed application is not an always-on application.

If it is determined that the installed application is not an always-on application, the processor 120 or the application control module 220 may determine at step 405 whether there is an execution request made by a user for executing the installed application. The user may make an input to request for executing the application. Step 405 is not automatically executed and is determined to execute in response to the user request. The procedure goes to step 407 for the case where there is an execution request and to step 406 for the case where there is no execution request.

If there is no execution request, the processor 120 or the application control module 220 may update application information at step 406. The operation of step 406 may be performed for the case where the application is not an always-on application and there is no application execution request. The application information update operation may include updating an application version by an application manager and updating internal application information autonomously. If the application information is updated, the application type may be changed. For example, if the application type is changed, the application execution condition may be changed. For example, the application type may be changed from the application executed in response to a user request to an application running in the background or an always-on application. The processor 120 may update the application information periodically or selectively until there is a request for executing the installed application. After the processor 120 updates the application information, the procedure may return to step 403.

If there is a request for execution of the installed application, the processor 120 or the application control module 220 may determine at step 407 whether it is possible to establish a connection to a network. The processor 120 may determine whether it is possible to establish a connection to a network if the installed application is an always-on application or if there is a request for executing the installed application. For example, if the installed application is an application requiring PDU session establishment, the processor may determine whether it is possible to connect to a network for establishing a PDU session. The procedure may go to step 409 for the case where it is possible to connect to a network and go to step 408 for the case where it is impossible to connect to a network.

If it is impossible to connect to a network, the processor 120 or the PDU session control module 240 may perform a PDU session control process according to the network status at step 408. The network status-based PDU session control processor may include the operations of FIG. 6 described below. If it is currently impossible to connect to a network for establishing a PDU session required for executing the application, the procedure goes to step 408. If the network status is changed such that it becomes possible to connect to a network, the processor 120 may establish a PDU session for executing the application at step 409.

If it is possible to connect to a network, the processor 120 or PDU session control module 240 may establish a PDU session for the installed application at step 409. The processor 120 may establish the PDU session corresponding to the application for executing the installed application. The processor 120 may establish a PDU session and execute the application. For example, if the installed application is a game application, the processor 120 may establish a PDU session for providing the game service.

Figure 5:
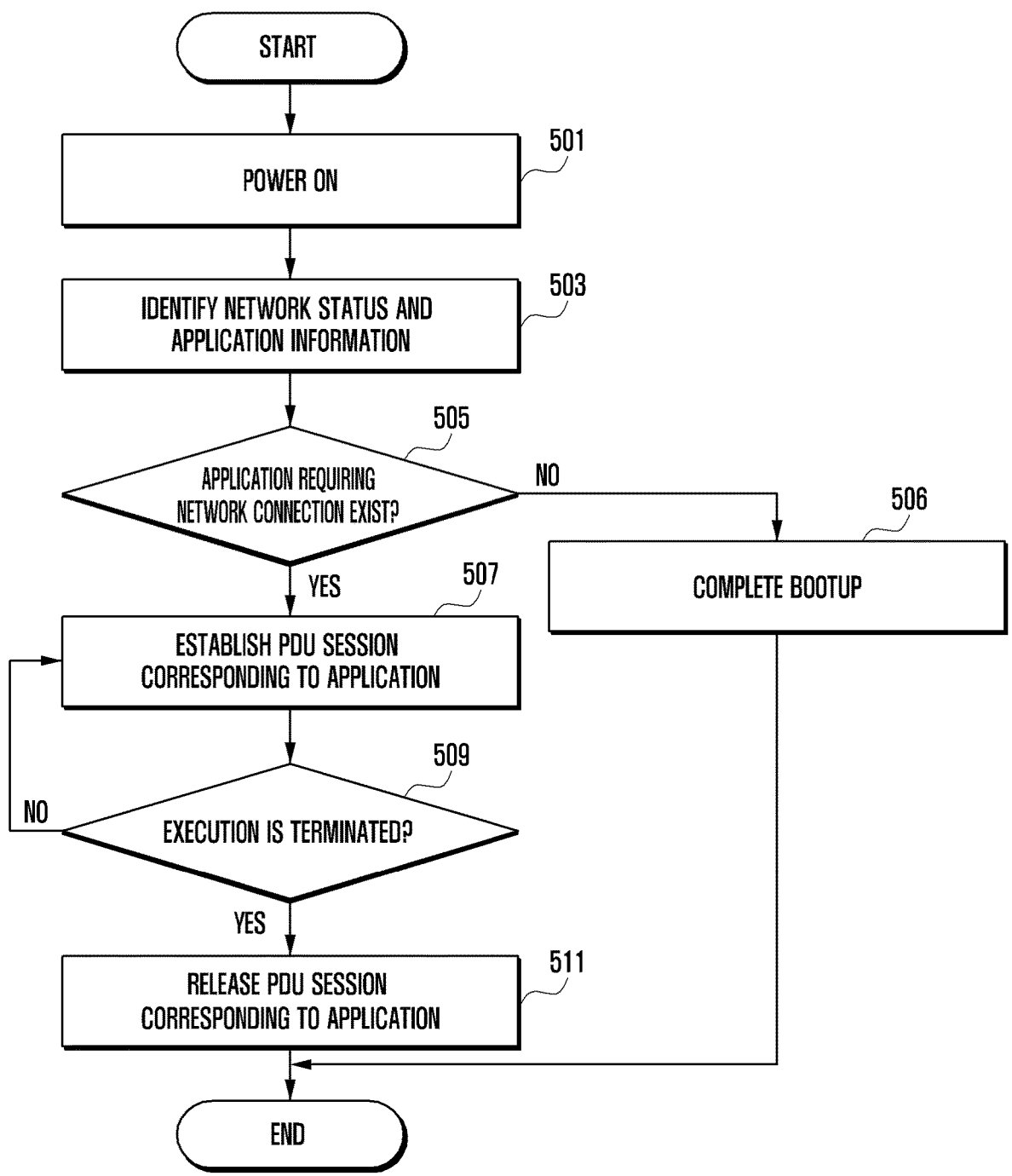
FIG. 5 is a flowchart of a PDU session control method of an electronic device according to an embodiment.

FIG. 5 is a flowchart of a PDU session control method of an electronic device according to an embodiment.

Referring to FIG. 5, a processor (processor 120 in FIG. 1) of the electronic device (e.g., electronic device 101 in FIG. 1) may power on at step 501. If the electronic device 101 powers on, this indicates that power is supplied such that the electronic device 101 boots up.

At step 503, the processor 120 may identify network status and application information. If the electronic device 101 boots up, the processor 120 or the network monitoring module 230 in FIG. 2 may identify configuration information (e.g., an APN and a DNN) of the electronic device 101 and connect the electronic device 101 to the network. For example, the processor 120 connects the electronic device 101 to an LADN depending on the location of the electronic device 101. If the application is an application running in the background or an always-on application, the application may stay running unless the electronic device 101 powers off. The processor 120 may execute the application based on the information on the connected network and the application information. For this purpose, the processor 120 may perform the operation of step 505.

At step 505, the processor 120 or the application control module 220 in FIG. 2 may determine whether there is an application requiring a network connection. An application requiring a network connection may be an application that stays running while the electronic device 101 is in a turn-on state. The processor 120 may determine whether there is an application configured to be automatically executed during bootup based on the application information. The processor 120 may also determine whether there is an application connectable to the network in a current network status after the electronic device has connected to the network. For example, an application configured to be automatically executed during the bootup may not be executed in the current network status. The processor 120 may perform the operation of step 507 for a case where there is an application requiring a network connection and perform the operation of step 506 for a case where there is no application requiring a network connection.

If there is no application requiring a network connection, the processor 120 may complete the bootup at step 506. For example, the processor 120 may complete the bootup for the case where there is no application that is to be executed in the current network status.

If there is an application requiring a network connection, the processor 120 or the PDU session control module 240 in FIG. 2 may establish a PDU session for the application at step 507. The processor may establish the PDU session for the application to execute the application requiring a network connection. The processor 120 may establish a PDU connection and execute the application. The executed application may be an application configured to be automatically executed during bootup (e.g., background execution) and may be executable in the current network status. For example, the processor 120 may establish a PDU session to execute a messenger application for providing a messenger service.

Although steps 501, 503, 505, and 507 are separately depicted in FIG. 5, the operations of steps 501, 503, 505, and 507 may be simultaneously performed such that a network connection is established along with automatic executions of necessary applications during the boot.

The processor 120 or the application control module 220 in FIG. 2 may determine at step 509 whether the application is terminated. For example, the processor 120 may determine where there is a user request for terminating the executed application. The processor 120 may also determine whether the network status is changed so as to make it difficult for the application to run. The method proceeds to step 511 for a case where the application is terminated and returns to step 506 for a case where the application is not terminated.

If the application is terminated, the processor 120 or the PDU session control module 240 in FIG. 2 may release the PDU session corresponding to the application at step 511. The processor 120 may terminate the executed application and release the PDU session established for executing the application. The processor 120 may terminate the application in response to a user request or in accordance with the current network status making it difficult for the application to stay running and release the PDU session, thereby saving resources.

Figure 6:
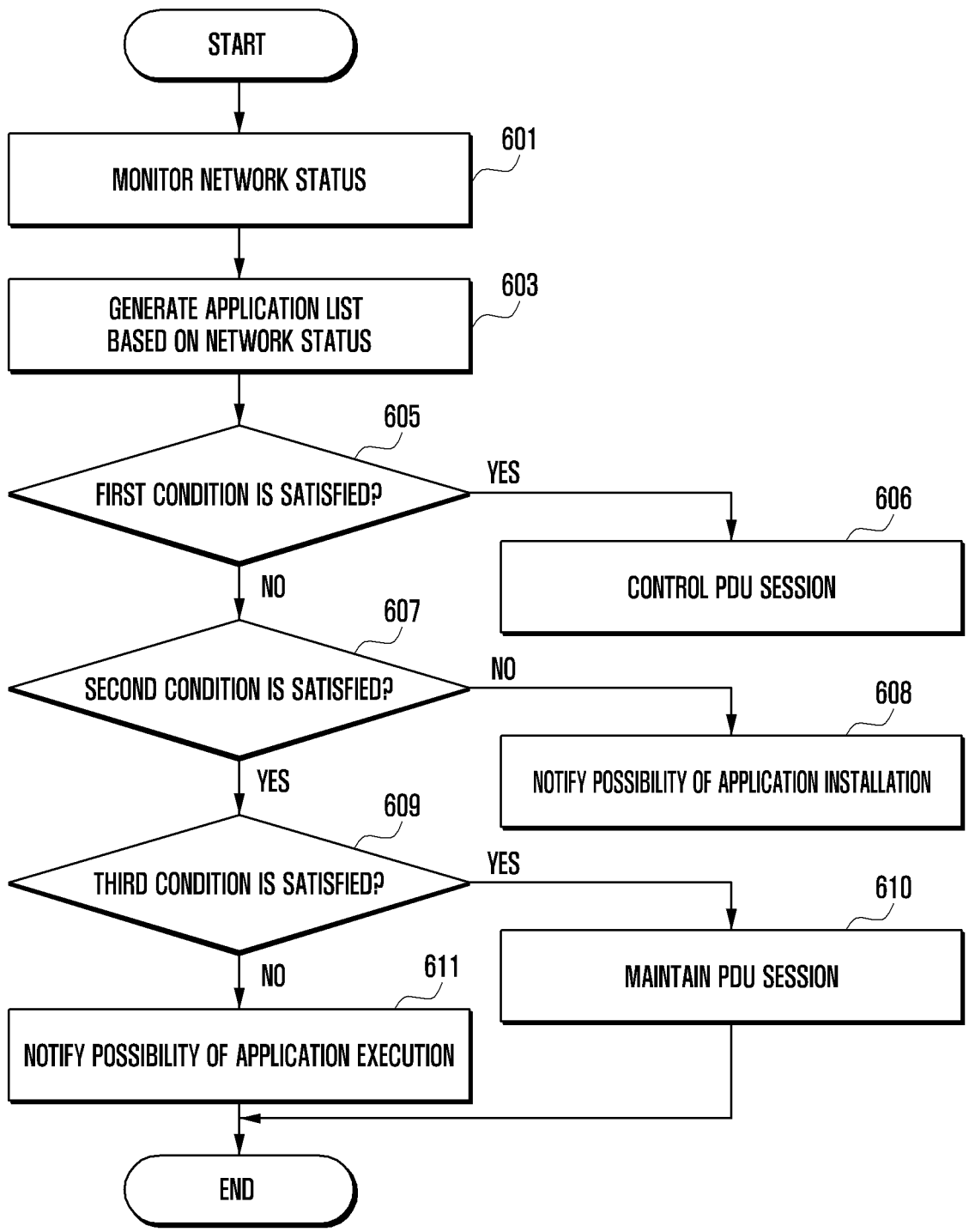
FIG. 6 is a flowchart of a network information-based PDU session control method of an electronic device according to an embodiment.

FIG. 6 is a flowchart of a network information-based PDU session control method of an electronic device according to an embodiment.

Referring to FIG. 6, a processor (e.g., processor 120 in FIG. 1) of the electronic device (e.g., electronic device 101 in FIG. 1) may monitor for network status at step 601. The processor 120 or the network monitoring module 230 in FIG. 2 may acquire network information varying in real time as the electronic device 101 moves. The processor 120 may control a network connection based on the acquired network information and configuration information of the electronic device 101. For example, if the electronic device 101 is located at a location connectable to an LADN, the processor 120 may connect the electronic device 101 to the LADN. If a local policy is changed according to the URSP update, the processor 120 may control the network connection based on the changed policy. The processor 120 may change a previously selected network slice instance based on the change in local policy, mobility, and subscriber information of the electronic device. When the network slice is changed, the network may return a new accepted NSSAI to the electronic device 101, and the electronic device 101 may transmit the new NSSAI via mobility management procedure signaling to trigger reselection of a slice instance. As the slice instance is changed, a CCNF may also be changed for supporting the new slice instance. The processor 120 may connect the electronic device 101 to a network slice instance close thereto depending on whether the MEC is in use.

At step 603, the processor 120 or the application control module 220 in FIG. 2 may generate an application list based on the network status. The processor 120 may search for an application executable in the current network status based on the network information and the application information. The application list may include information on the applications installed in the electronic device 101 and the applications not yet installed but that are installable in the electronic device 101. The applications not yet installed but that are installable in the electronic device 101 may include part of application information (e.g., application identifiers).

At step 605, the processor 120 or the application control module 220 in FIG. 2 may determine whether a first condition is satisfied. The first condition is that there is an application requiring change of a PDU session among the running applications. The processor 120 may control the PDU session according to the current network status without intervention of the user. For this purpose, the processor 120 may determine whether the first condition is satisfied based on the current network status and the application information. The processor 120 may perform the operation of step 606 for a case where the first condition is satisfied and perform the operation of step 607 for a case where the first condition is not satisfied.

If the first condition is satisfied, the processor 120 or the PDU session control module 240 in FIG. 2 may control, at step 606, the PDU session corresponding to the application. For example, if it becomes difficult to maintain the previously established PDU session because of the change of the network status, the processor 120 may change the PDU session to make it possible for the application to stay running. The processor 120 may release a first PDU session and establish a second PDU session. For example, the processor 120 may perform a PDU session handover. The processor 120 may terminate the executed application. For example, if it is difficult to change the PDU session, the processor 120 may terminate the running application. For example, the processor 120 may try to change the PDU session to make it possible for the application to stay running and may fail to change the PDU session in the current network status. If it fails to establish a PDU connection for an application requiring PDU session establishment, the processor 120 may terminate execution of the application.

If the first condition is not satisfied, the processor 120 or the application control module 220 in FIG. 2 may determine at step 607 whether a second condition is satisfied. The second condition may be that the installed application is included in the application list. The processor 120 may perform the operation of step 609 for a case where the second condition is satisfied and the operation of step 608 for a case where the second condition is not satisfied. The second condition may also be that an installable application is included in the application list. The processor 120 may perform the operation of step 609 for the installed application and perform the operation of step 608 for the installable application.

If the second condition is not satisfied, the processor 120 (e.g., application control module 220 in FIG. 2 may notify the possibility of installation of an application at step 608. If it is possible to establish a new PDU session in the current status, the processor 120 may notify the user that there is an application installable in association with the new PDU session. If there are installable applications in the application list, the processor 120 may display a list of the installable applications. For example, the processor 120 may provide the installable application list including application guide information including at least one of a text, an image, or a video related to the installable applications. The processor 120 may display the application guide information on a display 160.

The processor 120 may install an installable application based on the settings of the electronic device 101 or a user input. For example, if the installable application is configured to be automatically installed in the settings of the electronic device 101, the processor may install the installable application. The processor 120 may also provide an installable application list and install an application requested by the user for installation among the applications contained in the installable application list.

If the second condition is satisfied, the processor 120 or the application control module 220 may determine at step 609 whether a third condition is satisfied. The third condition may be that a running application is included among the applications contained in the application list. The processor 120 may perform the operation of step 610 for a case where the third condition is satisfied and perform the operation of step 611 for a case where the third condition is not satisfied. The third condition may be that an executable application is included in the application list. The processor 120 may perform the operation of step 610 for the running application and the operation of step 611 for the executable application.

If the third condition is satisfied, the processor 120 or the PDU session control module 240 in FIG. 2 may maintain the PDU session at step 610. The processor 120 may maintain the PDU session for the running application if it is determined that there is no need to change the PDU session based on the network status through the operations of steps 605, 607, 608, and 609.

If the third condition is not satisfied, the processor 120 or the application control module 220 in FIG. 2 may notify the possibility of execution of an application at step 611. If it is possible to establish a new PDU session based on the network status, the processor 120 may notify the user that there is an application executable in association with the new PDU session. If there is an executable application in the application list, the processor may execute the executable application. For example, if the executable application is configured to be automatically executed in the settings of the electronic device 101, the processor 120 may execute the application. The processor 120 may also provide an executable application list and execute an application requested by the user for execution among the applications contained in the executable application list.

Figure 7:
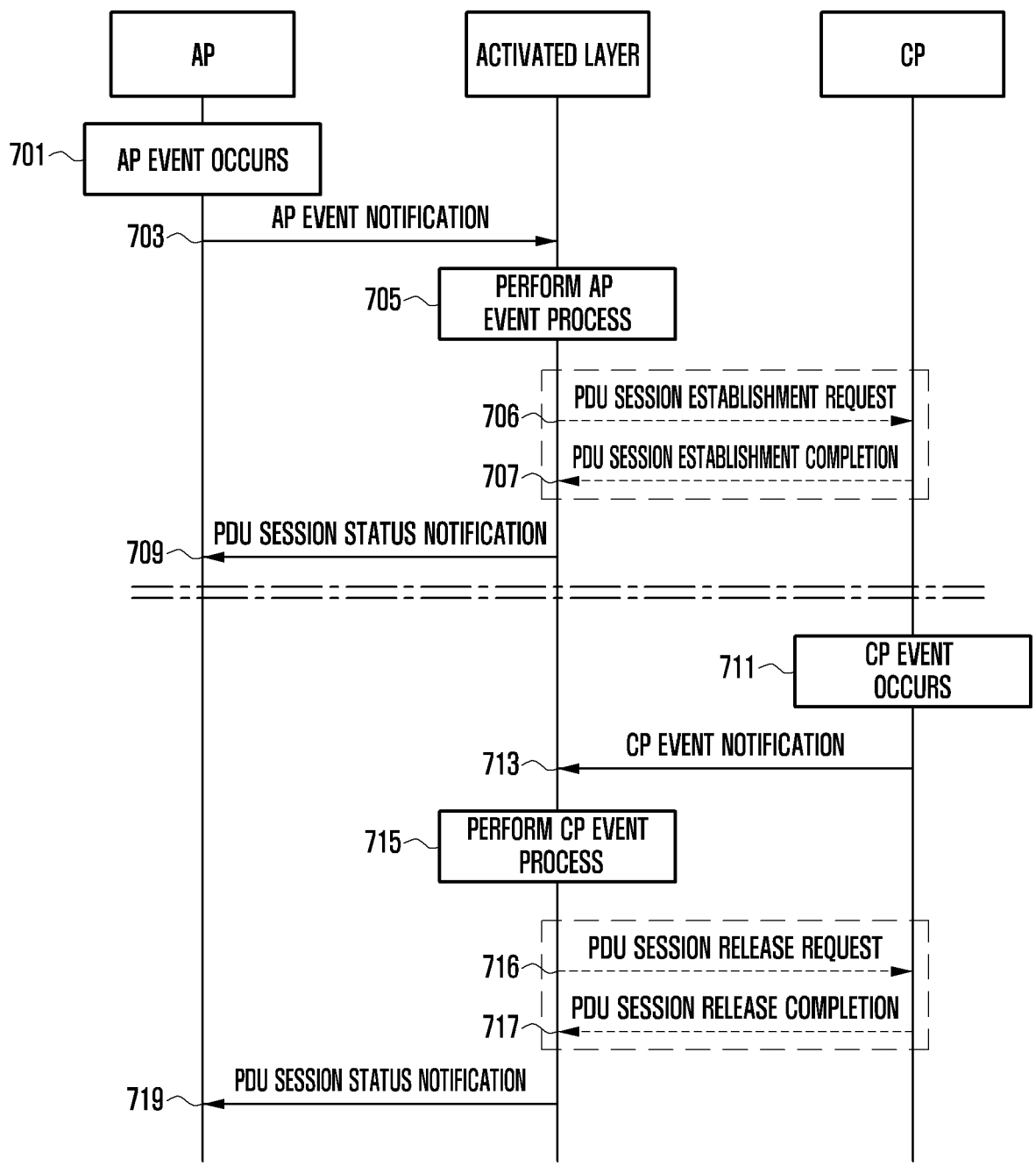
FIG. 7 is a signal flow diagram of a method of controlling a PDU session in an activation layer of an electronic device according to an embodiment.

FIG. 7 is a signal flow diagram of a method for controlling a PDU session in an activation layer of an electronic device according to an embodiment.

Referring to FIG. 7, an AP (e.g., the main processor 121 of FIG. 1) may generate an AP event at step 701. The AP may generate an AP event upon detection of a user request for installing or executing an application. At step 703, the AP notifies an activation layer (e.g., an enabling layer) of the AP event. The activation layer may be included in the function processing module 200 or the frame framework.

At step 705, the activation layer may perform an AP event process. The AP event process may include an operation for controlling a PDU session based on application information. For example, the AP event processor may include an operation described with reference to FIG. 4 or FIG. 5. If it is determined to establish a PDU session, the activation layer may request to a CP at step 706 for PDU session establishment.

At step 707, the CP (e.g., the auxiliary processor 123 in FIG. 1) may establish a PDU session and notify the activated layer of the establishment of the PDU session.

At step 709, the activation layer may notify the AP of a PDU session status. The activation layer may notify the AP of the PDU session establishment upon notification of the PDU session establishment from the CP.

At step 711, the CP may generate a CP event. The CP may generate the CP event if it becomes possible to establish a new PDU session or difficult to maintain a previously established PDU session. At step 713, the CP may notify the activation layer of the CP event. At step 715, the activation layer may performs a CP event process. The CP event process may include an operation for controlling the PDU session based on the network information. For example, the CP event processor may include an operation described above with reference to FIG. 6. If it is determined to release the PDU session, the activation layer may request to the CP at step 716 for PDU session release.

At step 717, the CP may release the PDU session in response to the request and notify the activation layer of the PDU session release.

At step 719, the activation layer may notify the AP of a PDU session status. The activation layer may notify the AP of the PDU session release upon notification of the PDU session release from the CP.

Figure 8:
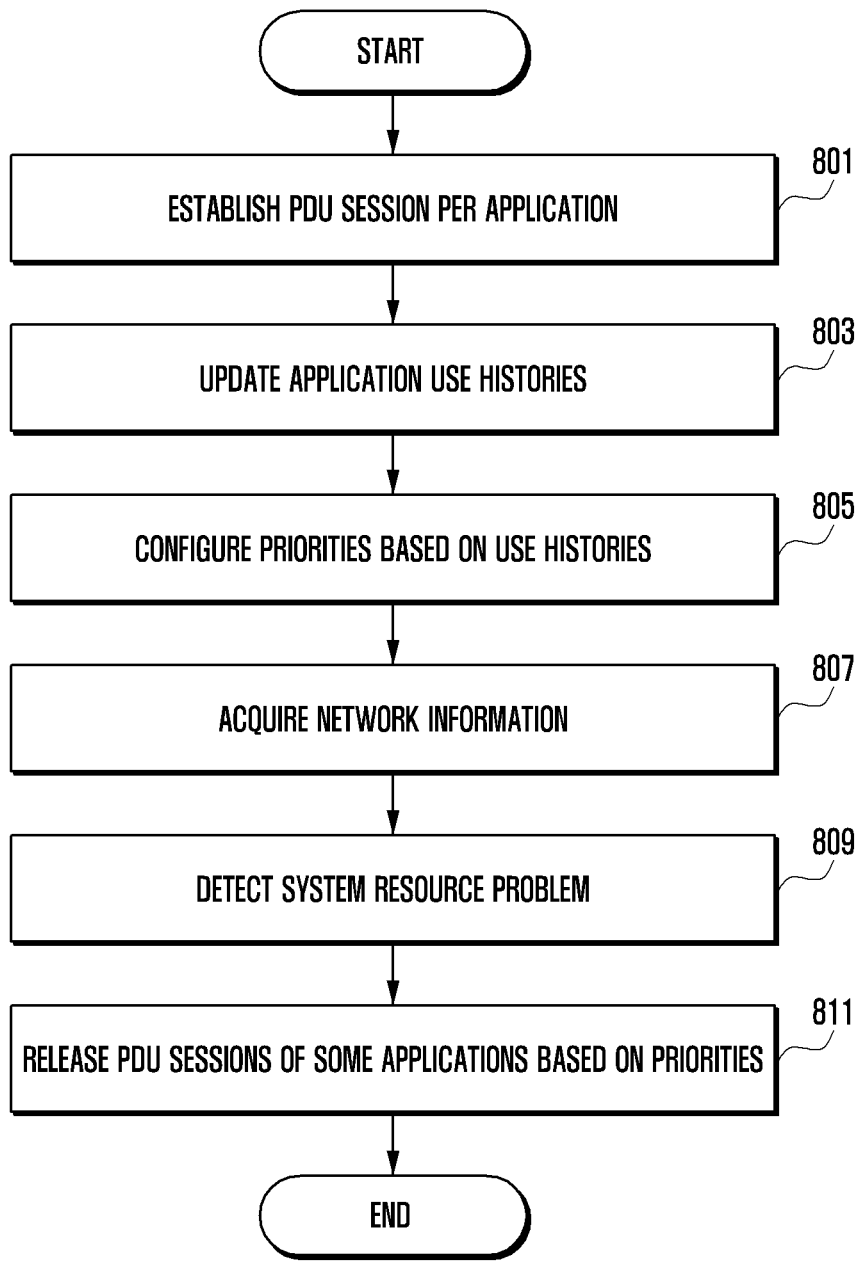
FIG. 8 is a flowchart of a priority-based PDU session release method of an electronic device according to an embodiment.

FIG. 8 is a flowchart of a priority-based PDU session release method of an electronic device according to an embodiment.

Referring to FIG. 8, a processor (e.g., processor 120 in FIG. 1) of the electronic device (e.g., electronic device 101 in FIG. 1) may establish a PDU session per application at step 801. In a 5G communication system supporting various types of data services and applications, PDU sessions may differ between applications. The processor 120 or the PDU session control module 240 in FIG. 2 may establish a PDU session per application.

At step 803, the processor 120 or the application control module 220 in FIG. 2 may update application use histories. The processor 120 may collect the per-application use histories during a predetermined period (e.g., one day, one week, one month, and one power cycle) and store the per-application use histories in a memory 130. An application use history may indicate a use time or a number of uses of the corresponding application.

At step 805, the processor 120 or the application control module 220 may prioritize applications based on the use histories. For example, the processor 120 may assign a high priority as use time or use frequency increases (e.g., frequently), and a low priority as use time or the use frequency is lower (e.g., sporadically).

At step 807, the processor 120 or the network monitoring module 230 in FIG. 2 may acquire network information. The processor 12 may acquire the network information in real time and monitor the network information for any change in the network status because the network status changes as the electronic device 101 moves. The network information may include at least one of information indicating whether allowed NSSAI is changed, information indicating whether an LADN is supported, information indicating whether MEC is supported, or information indicating whether a URSP is changed.

At step 809, the processor 120 or the PDU session control module 240 in FIG. 2 may determine whether a problem arises in at least one of system resources of the device 101 based on the network information. The electronic device 101 is designed to manage constrained hardware or software resources (e.g., a process, memory, and power). For example, if the electronic device 101 is running short of system resources, the processor 120 may terminate execution of some processes (e.g., stop execution of an application) or execute a new process (e.g., apply a power-saving mode) according to a predetermined rule. The processor 120 may determine whether the operation of step 810 causes a system resources problem.

At step 811, the processor 120 or the PDU session control module 240 in FIG. 2 may release PDU sessions for some applications based on the priorities of the applications. For example, if a system resource problem occurs, the processor 120 may terminate execution of some applications with low priorities. The processor 120 may release the PDU sessions corresponding to the execution-terminated applications. For example, if the processor 120 fails to establish a new PDU session because of the system resources constraint even though it has tried to establish a PDU session based on the network information indicative of a positive possibility of establishment of a new PDU session, the processor 120 may release PDU sessions corresponding to some applications with low priorities and establish a new PDU session. For example, an application requiring a new PDU session may be prioritized over an application of which the PDU session is to be released.

Figure 9:
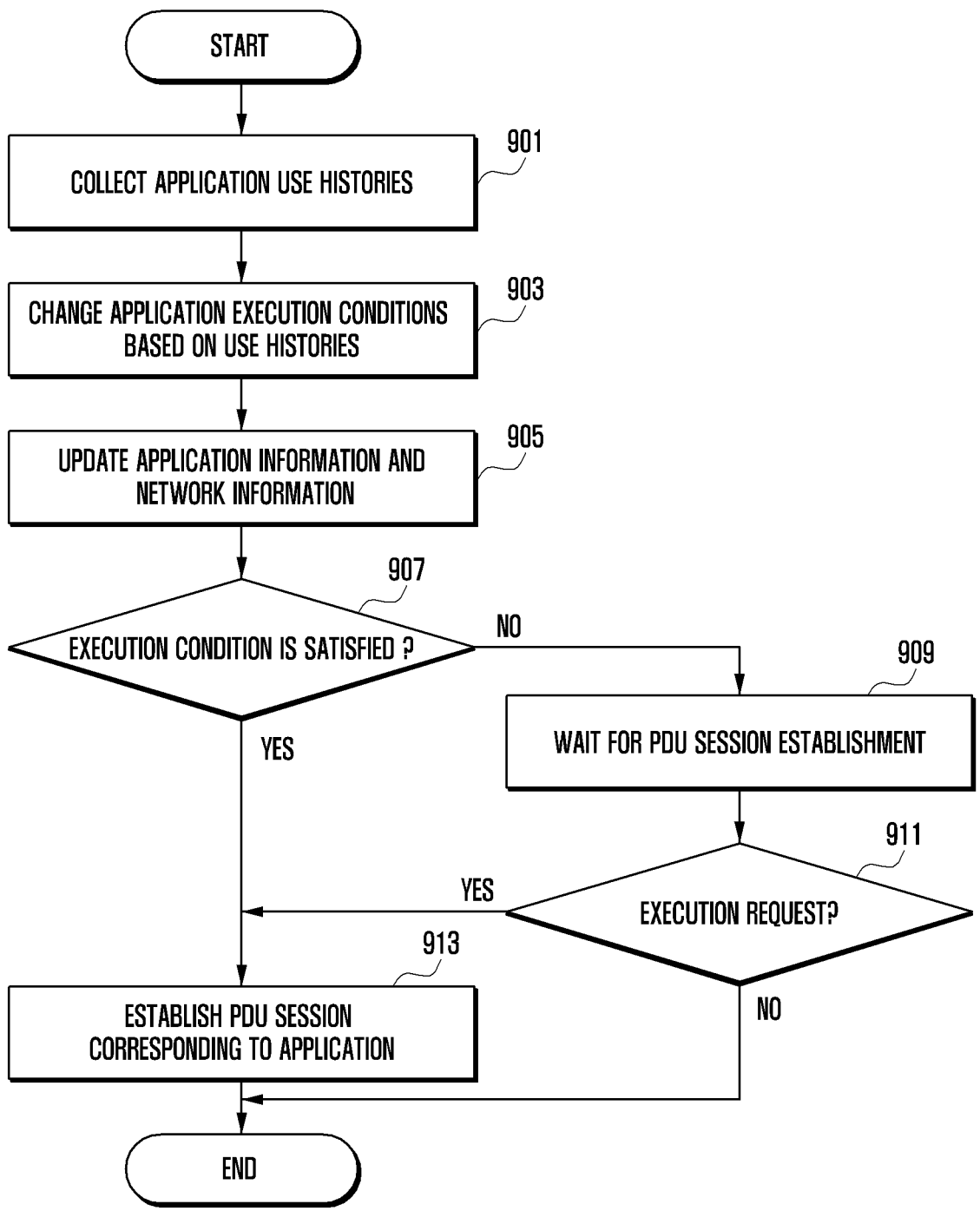
FIG. 9 is a flowchart of an application use history-based PDU session control method of an electronic device according to an embodiment.

FIG. 9 is a flowchart of an application use history-based PDU session control method of an electronic device according to an embodiment.

Referring to FIG. 9, a processor (e.g., processor 120 in FIG. 1) of the electronic device (e.g., electronic device 101 in FIG. 1) may collect application use histories at step 901. The processor 120 may collect per-application use histories during a predetermined time period (e.g. one day, one week, one month, and one power cycle) and store the per-application user histories in the memory 130. An application use history may indicate a use time or a number of uses of the corresponding application.

At step 903, the processor 120 or the application control module 220 in FIG. 2 may change an application execution condition based on the use history of the application. The processor 120 may change the execution condition of an application that has never been used during a predetermined period (e.g., one month, three months, and six months). For example, if an application of which the execution condition is set to "always-on" has never been used for one month, the processor 120 may reset the execution condition to "on request". If an application of which the execution condition is set to "background running" is not used frequently, the processor may reset the execution condition to "on request". If it is determined that the user does not use the electronic device 101 between 12:00 PM and 7:00 AM based on the application use histories, the processor 120 may (re)set an execution condition such that a PDU session is established at 7:00 AM. If it is determined that the electronic device 101 has an alarm clock (e.g. a wakeup alarm) set to 7:00 AM based on the application use histories, the processor 120 may set an execution condition such that a PDU session is established at 7:00 AM.

At step 905, the processor may update application information and network information. The processor 120 or the application control module 220 in FIG. 2 may periodically or selectively acquire updated application information from an application provider. The processor 120 or the network monitoring module 230 in FIG. 2 may acquire the network information updated in real time as the electronic device moves.

At step 907, the processor 120 or the application control module 220 in FIG. 2 may determine whether an application execution condition is satisfied. The processor 120 may determine whether the current status fulfills the application execution condition based on the application information and the network information. For example, if it becomes possible to establish a new PDU session as the network status is changed and if there is an application installed that is associated with the new PDU session, the processor 120 may determine that the application execution condition is satisfied. The processor 120 may also determine whether the current time is an alarm time and, if so, it determines that the application execution condition is satisfied. The processor 120 may perform the operation of step 913 for a case where the application execution condition is satisfied and perform the operation of step 909 for a case where the application execution condition is not satisfied.

If the application execution condition is not satisfied, the processor 120 waits for PDU session establishment at step 909. For example, if the network status is not available for establishing a PDU session even though there is an installed application executable, the processor 120 may wait until the network status is changed.

At step 911, the processor 120 may determine whether there is a request for executing an application. The processor 120 may receive an application execution request made by the user. The processor 120 may also determine whether the network status is changed to make it possible to establish a PDU session. The processor 120 may perform the operation of step 913 for a case where an application execution request is received and terminates the procedure for the case where no application execution request is received. The procedure may return to step 901 rather than being terminated for a case where no application execution request is received. This is just an exemplary implementation but is not intended to limit the present disclosure.

If the application execution condition is satisfied, the processor 120 or the PDU session control module 240 in FIG. 2 may establish a PDU session corresponding to the application at step 913. The processor 120 may establish the PDU session based on the application information and the network status. The processor 120 may also establish the PDU session based on the network status in association with the application requested to be executed.

According to various embodiments, an operation method of an electronic device includes identifying application information stored in a memory of the electronic device, monitoring for network status using a communication module of the electronic device, and controlling a PDU session based on the application information or the network status.

Controlling the PDU session may include establishing the PDU session based on the application information or execution of an application corresponding to the established PDU session.

The operation method may further include releasing the PDU session corresponding to the executed application based on the network status and terminating the executed application.

The operation method may further include generating an application list based on the network status and executing an executable application, according to settings of the electronic device or in response to a user input, based on the application list including the executable application.

The operation method may further include collecting a use history of an application and releasing a PDU session corresponding to a running application based on the use history.

The embodiments disclosed in the present disclosure and the accompanying drawings are provided to help explain and facilitate understanding of the present disclosure but are not intended to limit the scope of the present disclosure. Thus, the scope of the present disclosure as defined by the appended claims and their equivalents is intended to include the disclosed embodiments and all possible variations and modifications derived therefrom on the basis of the present disclosure.

What is claimed is:

1. A mobile terminal, comprising:
a memory;
a communication module; and
a processor configured to:
receive information of a network status through the communication module,
install an application in response to a user request,
execute the installed application if an application type of the installed application is an always-on application always running in a background,
establish a packet data unit (PDU) session, when the received information of the network status allows a PDU session establishment corresponding to the installed application,
update, periodically or selectively, application information including the application type of the installed application while the installed application is not executed, if the application type of the installed application is not the always-on application, and
change the application type of the installed application to the always-on application based on the updated application information.

2. The mobile terminal of claim 1, wherein the processor is further configured to release the PDU session based on whether an allowed network slice selection assistance information (NSSAI) included in the information of the network status is changed.

3. The mobile terminal of claim 1, wherein the processor is further configured to, in response to a request for terminating execution of an application for which a PDU session is established from a user, release the PDU session corresponding to the application and terminate the execution of the application.

4. The mobile terminal of claim 1, wherein the processor is further configured to:
release a PDU session corresponding to an executing application when an allowed network slice selection assistance information (NSSAI) included in the information of the network status is changed, and
terminate execution of the executing application.

5. The mobile terminal of claim 1, wherein the processor is further configured to change the PDU session corresponding to an executing application based on the information of the network status being changed according to a location of the mobile terminal.

6. The mobile terminal of claim 1, wherein the processor is further configured to generate an application list based on the information of the network status and notify, a user of a presence of an installable application based on the application list including the installable application, and
wherein the information of the network status includes at least one of information indicating whether an allowed network slice selection assistance information (NSSAI) is changed, information indicating whether local area data network (LADN) is supported, information indicating whether multi-access edge computing (MEC) is supported, or information indicating whether user equipment (UE) route selection policy (URSP) is changed.

7. The mobile terminal of claim 6, wherein the processor is further configured to install the installable application based on settings of the mobile terminal or a user input.

8. The mobile terminal of claim 1, wherein the processor is further configured to:
generate an application list based on the information of the network status being changed according to a location of the mobile terminal, and
notify a user of a presence of an executable application based on the application list including the executable application.

9. The mobile terminal of claim 8, wherein the processor is further configured to execute the executable application based on a settings of the mobile terminal or a user input.

10. The mobile terminal of claim 1, wherein the processor is further configured to collect a use history of an application and release a PDU session corresponding to a running application based on the use history.

11. The mobile terminal of claim 10, wherein the processor is further configured to control to configure a priority based on the use history and release the PDU session corresponding to the running application based on the information of the network status being changed according to a location of the mobile terminal and the priority.

12. The mobile terminal of claim 10, wherein the processor is further configured to change an application execution condition based on the use history and establish a PDU session corresponding to the application based on the changed application execution condition.

13. The mobile terminal of claim 1, wherein the information of the network status further includes information indicating whether a user equipment route selection policy (URSP) is changed, and
wherein the processor is further configured to release the established MU session when the URSP is changed.

14. A method of a mobile terminal, the method comprising:

receiving information of a network status through a communication module of the mobile terminal;

installing an application in response to a user request;

executing the installed application if an application type of the installed application is an always-on application always running in a background;

establishing a packet data unit (PDU) session, when the received information of the network status allows a PDU session establishment corresponding to the installed application;

updating, periodically or selectively, application information including the application type of the installed application while the installed application is not executed, if the application type of the installed application is not the always-on application; and changing the application type of the installed application to the always-on application based on the updated application information.

15. The method of claim 14, further comprising:

releasing the PDU session corresponding to the installed application based on whether an allowed network slice selection assistance information (NSSAI) included in the information of the network status is changed; and terminating the installed application.

16. The method of claim 14, further comprising:

generating an application list based on the information of the network status; and executing, if an executable application exists in the application list, the executable application, based on a setting of the mobile terminal or a user input, wherein the information on network status includes at least one of information indicating whether an allowed network slice selection assistance information (NSSAI) is changed, information indicating whether local area data network (LADN) is supported, information indicating whether multi-access edge computing (MEC) is supported, or information indicating whether user equipment (UE) route selection policy (URSP) is changed.

17. The method of claim 14, further comprising:

collecting a use history of an application; and releasing a PDU session corresponding to a running application based on the use history.

* * * * *